United States Patent
Shen (10) Patent No.: US 10,334,553 B2
(45) Date of Patent: Jun. 25, 2019

(54) WIRELESS COMMUNICATIONS NETWORK REGISTRATION METHOD AND TERMINAL

(71) Applicant: Huawei Technologies Co., Ltd., Shenzhen (CN)

(72) Inventor: Li Shen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/062,472

(22) PCT Filed: Jan. 20, 2016

(86) PCT No.: PCT/CN2016/071461
§ 371 (c)(1),
(2) Date: Jun. 14, 2018

(87) PCT Pub. No.: WO2017/124328
PCT Pub. Date: Jul. 27, 2017

(65) Prior Publication Data
US 2018/0376442 A1 Dec. 27, 2018

(51) Int. Cl.
*H04W 60/00* (2009.01)
*H04W 48/18* (2009.01)
(Continued)

(52) U.S. Cl.
CPC ......... *H04W 60/005* (2013.01); *H04W 8/183* (2013.01); *H04W 48/18* (2013.01); *H04W 88/06* (2013.01); *H04W 84/042* (2013.01)

(58) Field of Classification Search
CPC ..... H04W 8/183; H04W 48/18; H04W 88/06; H04W 84/042; H04W 60/005
(Continued)

(56) References Cited

U.S. PATENT DOCUMENTS

2010/0159988 A1 6/2010 Lee
2011/0151858 A1 6/2011 Lai
(Continued)

FOREIGN PATENT DOCUMENTS

CN 101945502 A 1/2011
CN 101977417 A 2/2011
(Continued)

OTHER PUBLICATIONS

Machine Translation and Abstract of Chinese Publication No. CN101945502, Jan. 12, 2011, 20 pages.
(Continued)

*Primary Examiner* — Kamran Afshar
*Assistant Examiner* — Farid Seyedvosoghi
(74) *Attorney, Agent, or Firm* — Conley Rose, P.C.

(57) ABSTRACT

A wireless communications network registration method applied to a dual-card dual-pass terminal including a first modem and a second modem. The method includes reading, by the terminal, a card identifier from a subscriber identity card, and if a quantity of subscriber identity cards in the terminal is one and a service provider identifier of the subscriber identity card is a preset identifier, performing, by the terminal, packet switched (PS) registration for the first modem using the card identifier of the subscriber identity card, and performing, by the terminal, circuit switched (CS) registration for the second modem using the card identifier of the subscriber identity card. An embodiment of the present disclosure further provides a terminal. Hence, a problem that a terminal cannot implement concurrency of a data service and a voice call can be resolved.

15 Claims, 4 Drawing Sheets

(51) Int. Cl.
*H04W 88/06* (2009.01)
*H04W 8/18* (2009.01)
*H04W 84/04* (2009.01)

(58) Field of Classification Search
USPC .......................................................... 455/558
See application file for complete search history.

(56) References Cited

U.S. PATENT DOCUMENTS

| | | | | |
|---|---|---|---|---|
| 2013/0235847 | A1* | 9/2013 | Li | H04W 48/18 370/331 |
| 2014/0140287 | A1* | 5/2014 | Cheng | H04W 76/10 370/329 |
| 2015/0245309 | A1 | 8/2015 | Nayak et al. | |
| 2015/0358935 | A1 | 12/2015 | Stegall | |
| 2016/0088674 | A1* | 3/2016 | Kotreka | H04W 36/0022 370/329 |
| 2016/0330618 | A1* | 11/2016 | Ren | H04W 12/04 |

FOREIGN PATENT DOCUMENTS

| | | |
|---|---|---|
| CN | 102572794 A | 7/2012 |
| CN | 101951666 B | 5/2013 |
| CN | 103987099 A | 8/2014 |
| CN | 104883713 A | 9/2015 |

OTHER PUBLICATIONS

Machine Translation and Abstract of Chinese Publication No. CN102572794, Jul. 11, 2012, 20 pages.
Machine Translation and Abstract of Chinese Publication No. CN103987099, Aug. 13, 2014, 12 pages.
Machine Translation and Abstract of Chinese Publication No. CN104883713, Sep. 2, 2015, 35 pages.
Foreign Communication From A Counterpart Application, PCT Application No. PCT/CN2016/071461, English Translation of International Search Report dated Oct. 9, 2016, 2 pages.
Foreign Communication From A Counterpart Application, PCT Application No. PCT/CN2016/071461, English Translation of Written Opinion dated Oct. 9, 2016, 6 pages.
Machine Translation and Abstract of Chinese Publication No. CN101951666, May 15, 2013, 17 pages.
Foreign Communication From A Counterpart Application, European Application No. 16885601.1, Extended European Search Report dated Oct. 8, 2018, 9 pages.

* cited by examiner

WIRELESS COMMUNICATIONS NETWORK REGISTRATION METHOD AND TERMINAL

CROSS-REFERENCE TO RELATED APPLICATION

This application is a national stage of International Patent Application No. PCT/CN2016/071461 filed on Jan. 20, 2016, which is hereby incorporated by reference in its entirety.

TECHNICAL FIELD

The present disclosure relates to the field of electronic technologies, and in particular, to a wireless communications network registration method and a terminal.

BACKGROUND

Wireless communications is a communication mode in which information exchange is performed using a feature that an electromagnetic wave signal can be transmitted in free space. Wireless communications is a communication environment that includes multiple types of networks such as a wireless local area network, a satellite communications system, a mobile communications system, digital broadcast, and a fixed access system. However, network architectures, transmission speeds, transmission instructions, transmission modes, and service quality policies of different networks are different. With rapid development of wireless communications technologies, human-centered communications services gain more appreciation and trust from users.

At present, a general terminal cannot implement concurrency of a data service and a voice call service. For example, in a Mobile circuit switched fallback (CSFB) manner, when a terminal performs a voice call, the terminal falls back to Global System for Mobile Communications (GSM). However, the GSM cannot support concurrency of the data service and the voice call service. The data service is in a disconnected state when the terminal performs the voice call. In this case, if a user needs to download a file, the user needs to disconnect the voice call and reconnect the data service of the terminal. This greatly decreases efficiency of handling a transaction by the terminal.

SUMMARY

Embodiments of the present disclosure provide a wireless communications network registration method and a terminal in order to resolve a problem that a terminal cannot implement concurrency of a data service and a voice call.

A first aspect of the embodiments of the present disclosure discloses a wireless communications network registration method that is applied to a dual-card dual-pass terminal. The terminal includes a first modem and a second modem. The method includes reading, by the terminal, a card identifier from a subscriber identity card, and performing, by the terminal, packet switched (PS) registration for the first modem using the card identifier of the subscriber identity card, and performing, by the terminal, circuit switched (CS) registration for the second modem using the card identifier of the subscriber identity card if a quantity of subscriber identity cards in the terminal is 1 and a service provider identifier of the subscriber identity card is a preset identifier.

With reference to the first aspect of the present disclosure, in a first possible implementation of the first aspect, if the quantity of subscriber identity cards in the terminal is 1 and the service provider identifier of the subscriber identity card is not the preset identifier, the terminal performs CS registration and PS registration for the first modem using the card identifier of the subscriber identity card.

With reference to the first possible implementation of the first aspect of the present disclosure, in a second possible implementation of the first aspect, after performing, by the terminal, CS registration and PS registration for the first modem using the card identifier of the subscriber identity card, the method further includes performing, by the terminal, PS registration for the second modem using the card identifier of the subscriber identity card when the terminal is in a call state and a current network standard of the terminal is GSM.

With reference to the first aspect or the first or the second possible implementation of the first aspect of the present disclosure, in a third possible implementation of the first aspect, if the quantity of subscriber identity cards in the terminal is 2 and the subscriber identity cards include a primary card and a secondary card, the terminal performs CS registration and PS registration for the first modem using a card identifier of the primary card, and the terminal performs GSM registration for the second modem using a card identifier of the secondary card.

With reference to the first aspect or the first to the third possible implementations of the first aspect of the present disclosure, in a fourth possible implementation of the first aspect, the method is applied to a 3-card 3-pass terminal, and the terminal includes a first modem, a second modem, and a third modem, and if a quantity of subscriber identity cards in the terminal is 3 and the subscriber identity cards include a primary card, a first secondary card, and a second secondary card, the terminal performs CS registration and PS registration for the first modem using a card identifier of the primary card, the terminal performs GSM registration for the second modem using a card identifier of the first secondary card, and the terminal performs GSM registration for the third modem using a card identifier of the second secondary card.

With reference to the first aspect or the first to the third possible implementations of the first aspect of the present disclosure, in a fifth possible implementation of the first aspect, the method is applied to a 3-card 3-pass terminal, and the terminal includes a first modem, a second modem, and a third modem, and if a quantity of subscriber identity cards in the terminal is 2 and the subscriber identity cards include a primary card and a secondary card, the terminal performs PS registration for the first modem using a card identifier of the primary card, the terminal performs CS registration for the second modem using the card identifier of the primary card, and the terminal performs GSM registration for the third modem using a card identifier of the secondary card.

A second aspect of the embodiments of the present disclosure discloses a terminal. The terminal has a terminal behavior function for implementing the foregoing method design. The function may be implemented by hardware, or may be implemented by hardware executing corresponding software. The hardware or software includes one or more modules corresponding to the foregoing function. The module may be software and/or hardware. The terminal includes a reading unit and a network registration unit, and is configured to perform related steps of the wireless communications network registration method provided in the first aspect of the embodiments of the present disclosure.

The reading unit is configured to read a card identifier from a subscriber identity card.

The network registration unit is configured to perform PS registration for the first modem using the card identifier of the subscriber identity card, and perform CS registration for the second modem using the card identifier of the subscriber identity card if a quantity of subscriber identity cards in the terminal is 1 and a service provider identifier of the subscriber identity card is a preset identifier.

A third aspect of the embodiments of the present disclosure discloses a terminal. A structure of the terminal includes a processor, a memory, a first modem, and a second modem. The processor is configured to support the terminal to execute corresponding functions in the foregoing method. The memory is configured to be coupled with the processor, and stores program instructions and data required by the terminal. The terminal may further include a communications interface configured to communicate, by the terminal, with another device or communications network. Code stored in the memory may execute the wireless communications network registration method provided in the present disclosure, for example, reading a card identifier from a subscriber identity card, and performing PS registration for the first modem using a card identifier of the subscriber identity card, and performing CS registration for the second modem using the card identifier of the subscriber identity card when a quantity of subscriber identity cards in the terminal is 1 and a service provider identifier of the subscriber identity card is a preset identifier.

The third aspect of the embodiments of the present disclosure discloses a computer storage medium configured to store a computer software instruction used by the terminal, where software includes a program designed to execute the foregoing aspects.

It can be learned that, in the embodiments of the present disclosure, when the quantity of subscriber identity cards read by the terminal is 1 and the service provider identifier of the subscriber identity card is the preset identifier, the terminal performs PS registration for the first modem using card identifier information of the subscriber identity card, and performs CS registration for the second modem using the card identifier information of the subscriber identity card. In this way, channels in which a data service and a voice service are located do not interfere with each other, and the data service and the voice service can be simultaneously performed. In this way, the terminal can implement concurrency of the data service and the voice call service, thereby improving efficiency of handling a transaction by the terminal.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The embodiments of the present disclosure provide a network registration method and multi card multi pass in order to resolve a problem that a terminal cannot implement concurrency of a data service and a voice call.

The following describes the embodiments in detail with reference to accompanying drawings.

In the specification, claims, and accompanying drawings of the present disclosure, the terms "first," "second," "third," "fourth," and so on are intended to distinguish between different objects but do not indicate a particular order. In addition, the terms "including," "comprising," and any other variant thereof are intended to cover a non-exclusive inclusion. For example, a process, method, system, product, or device that includes a series of steps or units is not limited to the listed steps or units, but optionally further includes an unlisted step or unit, or optionally further includes another step or unit inherent to such a process, method, product, or device.

Mentioning an "embodiment" in the specification means that a particular characteristic, structure, or feature described with reference to the embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

A terminal described in the embodiments of the present disclosure may include a handheld device (such as a mobile phone), a vehicular device (such as a vehicular navigator), a wearable device (such as a smart band), or another processing device connected to a wireless modem, where the device has a wireless communication function, and mobile electronic devices such as various terminals. Hardware of the terminal may support multiple network standards such as time division duplex (TDD)-Long Term Evolution (LTE)/frequency division duplex (FDD)-LTE/a Time Division-Synchronous Code Division Multiple Access (CDMA) (TD-SCDMA) system/Wideband CDMA (WCDMA)/GSM/China Telecom Evolution-data optimized (EVDO), and the hardware of the terminal may support multiple working modes such as a CSFB manner/single radio LTE (SRLTE)/simultaneous GSM and LTE (SGLTE)/simultaneous voice and LTE (SVLTE)/GSM.

Figure 1:
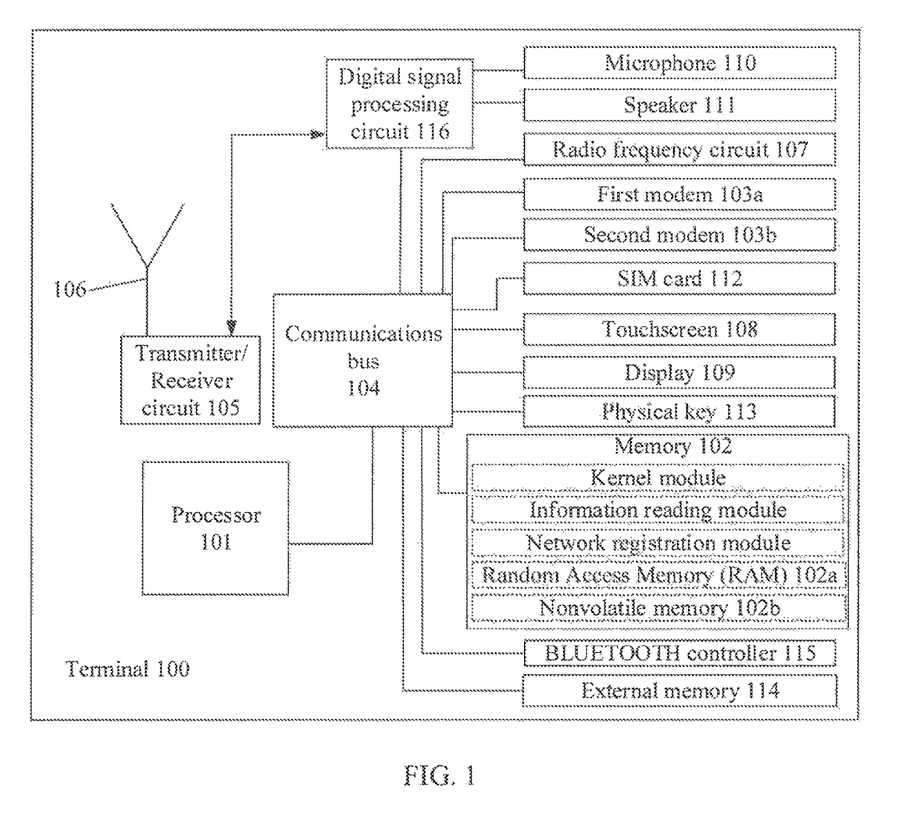
FIG. 1 is a composition architectural diagram of a terminal configured to implement a wireless communications network registration method according to an embodiment of the present disclosure.

To better understand the wireless communications network registration method and the terminal that are disclosed in the embodiments of the present disclosure, the following first describes, in detail, the terminal applicable to the embodiments of the present disclosure. Referring to FIG. 1, FIG. 1 is a composition architectural diagram of a terminal 100 of a wireless communications network registration method according to an embodiment of the present disclosure. The composition architectural diagram of the terminal 100 may include at least one processor 101, at least one memory 102, a first modem 103a, a second modem 103b, at least one communications bus 104, a receiver/transmitter circuit 105, at least two antennas 106, at least two radio frequency circuits 107, at least one touchscreen 108, at least one display 109, a microphone 110, a speaker 111, at least two subscriber identity modules (designated as SIM card) 112, a physical key 113, a random access memory (RAM) 102*a*, a nonvolatile memory 102*b*, an external memory 114, a BLUETOOTH controller 115, and a digital signal processing circuit 116. The two modems 103 may be integrated on one chip, or may be two independent modems. The processor 101 controls communication with an external cellular network using the receiver/transmitter circuit 104 and the antennas 106. The at least one memory may be, for example, the random access memory, the nonvolatile memory, the SIM card 112, or the external memory 114. The at least one memory 102 stores an instruction set. The instruction set is integrated in an operating system or an application program that can be executed by the processor 101. The instruction set can instruct the processor 101 to execute a network registration method disclosed in a method embodiment of the present disclosure.

The processor 101 in the terminal 100 can couple the at least one memory. The memory 102 prestores the instruction set. The instruction set includes an information reading module and a network registration module. The memory 102 further stores a kernel module. The kernel module includes an operating system (such as WINDOWS™, ANDROID™, or IOS™). The processor 101 invokes the instruction set to execute a wireless speaker adding method disclosed in an embodiment of the present disclosure. The method includes the following steps of running, by the processor 101 of the terminal 100, the information reading module in the memory 102 to read a card identifier from a subscriber identity card, and running, by the processor 101 of the terminal 100, the network registration module in the memory 102 to perform PS registration for the first modem using the card identifier of the subscriber identity card, and perform CS registration for the second modem using the card identifier of the subscriber identity card if a quantity of subscriber identity cards in the terminal is 1 and a service provider identifier of the subscriber identity card is a preset identifier.

Optionally, if the quantity of subscriber identity cards in the terminal is 1 and the service provider identifier of the subscriber identity card is not the preset identifier, the processor 101 of the terminal 100 runs the network registration module in the memory 102 to perform, using the card identifier of the subscriber identity card, CS registration and PS registration for the first modem.

Optionally, after running, by the processor 101 of the terminal 100, the network registration module in the memory 102 to perform, using the card identifier of the subscriber identity card, CS registration and PS registration for the first modem, when the terminal is in a call state and a current network standard of the terminal is GSM, the processor 101 of the terminal 100 runs the network registration module in the memory 102 to perform, using the card identifier of the subscriber identity card, PS registration for the second modem.

Optionally, if the quantity of subscriber identity cards in the terminal is 2 and the subscriber identity cards include a primary card and a secondary card, the processor 101 of the terminal 100 runs the network registration module in the memory 102 to perform, using a card identifier of the primary card, CS registration and PS registration for the first modem, and perform, by the terminal using a card identifier of the secondary card, GSM registration for the second modem.

It can be learned that, in this embodiment of the present disclosure, when the quantity of subscriber identity cards read by the terminal 100 is 1 and the service provider identifier of the subscriber identity card is the preset identifier, the terminal 100 performs PS registration for the first modem 103*a* using card identifier information of the subscriber identity card, and performs CS registration for the second modem 103*b* using the card identifier information of the subscriber identity card. In this way, channels in which a data service and a voice service are located do not interfere with each other, and the data service and the voice service can be simultaneously performed. In this way, the terminal 100 can implement concurrency of the data service and the voice call service, thereby improving efficiency of handling a transaction by the terminal 100.

Consistent with the technical solution described above, in a specific embodiment, FIG. 2 is a schematic flowchart of a wireless communications network registration method including a specific execution process of a terminal. Although the wireless communications network registration method described herein is executed based on the terminal 100 shown in FIG. 1, it should be noted that a specific running environment of the wireless communications network registration method disclosed in this embodiment of the present disclosure is not limited to the foregoing terminal 100.

Figure 2:
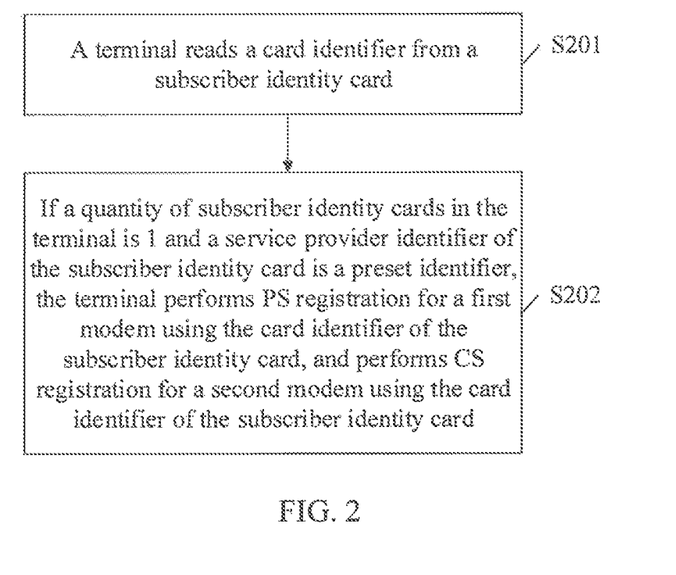
FIG. 2 is a schematic flowchart of a first embodiment of a wireless communications network registration method according to a method embodiment of the present disclosure.

As shown in FIG. 2, the wireless communications network registration method disclosed in this embodiment of the present disclosure includes the following steps.

Step S201. A terminal reads a card identifier from a subscriber identity card.

Optionally, the subscriber identity card may include a Mobile subscriber identity card, a Unicom subscriber identity card, a Telecom subscriber identity card, or the like. Optionally, the subscriber identity card may be a subscriber identity module (SIM) card, a universal SIM (USIM) card, or the like.

For example, a specific implementation of reading, by the terminal, the card identifier from the subscriber identity card is as follows. The terminal reads a service provider name (SPN) from an elementary file (EF) SPN (EFspn) field in the subscriber identity card, where the SPN is irrelevant with a currently registered network. For example, an SPN of a China Mobile card is always CMCC or China Mobile when the China Mobile card roams to any network. Alternatively, the terminal reads a public land mobile network (PLMN) of the subscriber identity card from a file that is in the subscriber identity card and that stores a PLMN network name (PNN), where PLMN is a combination of a country code (MCC) and a network code (MNC). For example, a PLMN of China Unicom is 460, 01; PLMNs of China Mobile are 460, 00 and 460, 02; a PLMN of China Telecom is 460, 03. Alternatively, the terminal reads an international mobile subscriber identity (IMSI) number of the subscriber identity card from an EFIMSI in the subscriber identity card. Alternatively, the terminal reads an integrated circuit card identity (ICCID) of the subscriber identity card from an EFICCID file in the subscriber identity card. The ICCID includes a total of 20 digits, and an encoding format of the ICCID is XXXXXX 0MFSS YYGXX XXXXX. The first six digits indicate a service provider code. 898600 and 898602 indicate China Mobile, 898601 indicates China Unicom, and 898603 indicates China Telecom. Alternatively, the terminal reads a mobile subscriber international integrated services digital network (ISDN) number (MSISDN) of the subscriber identity card from an EFMSISDN file in the subscriber identity card. The MSISDN includes a country code (CC), a national destination code (NDC), and a subscriber number (SN). Alternatively, the terminal reads an Evolved Packet System (EPS) Non-Access Stratum (NAS) security context (EPSNSC) from an EFEPSNSC file in the subscriber identity card. If the EPSNSC exists in the EFEPSNSC file, it indicates that the subscriber identity card is a subscriber identity card that can support a network standard of LTE.

Step S202. If a quantity of subscriber identity cards in the terminal is 1 and a service provider identifier of the subscriber identity card is a preset identifier, the terminal performs PS registration for the first modem using the card identifier of the subscriber identity card, and performs CS registration for the second modem using the card identifier of the subscriber identity card.

Optionally, the preset identifier may be 46000, 46002, or 46003, or may be 898600, 898602, or 898603.

Optionally, the subscriber identity card is a subscriber identity card that can support a network standard of LTE.

For example, at present, the terminal has only one subscriber identity card, a service provider identifier of the subscriber identity card is 46000, 46002, or 46003, a supportable network standard is LTE, and a working mode of the terminal is generally CSFB/SRLTE. However, in a voice call, the terminal falls back to GSM from CSFB/SRLTE in most cases. In these cases, the terminal cannot support concurrency of a data service and the voice call. In this embodiment of the present disclosure to implement concurrency of a data service and a voice call for the terminal, when the terminal has only one subscriber identity card, a service provider identifier of the subscriber identity card is 46000, 46002, or 46003, and a supportable network standard is LTE, the terminal performs PS registration for the first modem using a card identifier of the subscriber identity card, and the terminal performs CS registration for the second modem using the card identifier of the subscriber identity card (that is, the first modem is registered only with a PS service, and the second modem is registered only with a CS service, that is, an SGLTE technology/SVLTE technology is used).

SRLTE and SVLTE are basically a same concept, that is, a single card dual standby policy. When only one card is inserted in the terminal, the terminal can work both in an LTE network and a second generation (2G) or a third generation (3G) network. EPS Attach types of SGLTE and SVLTE are both EPS only. If a network with successful EPS Attach authentication is an evolved universal terrestrial radio access network (EUTRAN) of a GSM network, SGLTE is used. If a network with successful EPS Attach authentication is a CDMA network, SVLTE is used.

It should be noted that performing, by the terminal, PS registration and CS registration for the modem using the card identifier of the subscriber identity card is a technology well known by a person skilled in the art and is not described herein.

It can be learned that, in this embodiment of the present disclosure, when the quantity of subscriber identity cards read by the terminal is 1 and the service provider identifier of the subscriber identity card is the preset identifier, the terminal performs PS registration for the first modem using card identifier information of the subscriber identity card, and performs CS registration for the second modem using the card identifier information of the subscriber identity card. In this way, channels in which a data service and a voice service are located do not interfere with each other, and the data service and the voice service can be simultaneously performed. In this way, the terminal can implement concurrency of the data service and the voice call service, thereby improving efficiency of handling a transaction by the terminal.

Optionally, the wireless communications network registration method shown in FIG. 2 further includes performing, by the terminal, CS registration and PS registration for the first modem using the card identifier of the subscriber identity card if the quantity of subscriber identity cards in the terminal is 1 and the service provider identifier of the subscriber identity card is not the preset identifier.

Optionally, after performing, by the terminal, CS registration and PS registration for the first modem using the card identifier of the subscriber identity card, the wireless communications network registration method shown in FIG. 2 further includes performing, by the terminal, PS registration for the second modem using the card identifier of the subscriber identity card when the terminal is in a call state and a current network standard of the terminal is GSM.

Optionally, the wireless communications network registration method shown in FIG. 2 further includes performing, by the terminal, CS registration and PS registration for the first modem using a card identifier of the primary card, and performing, by the terminal, GSM registration for the second modem using a card identifier of the secondary card if the quantity of subscriber identity cards in the terminal is 2 and the subscriber identity cards include a primary card and a secondary card.

Figure 3:
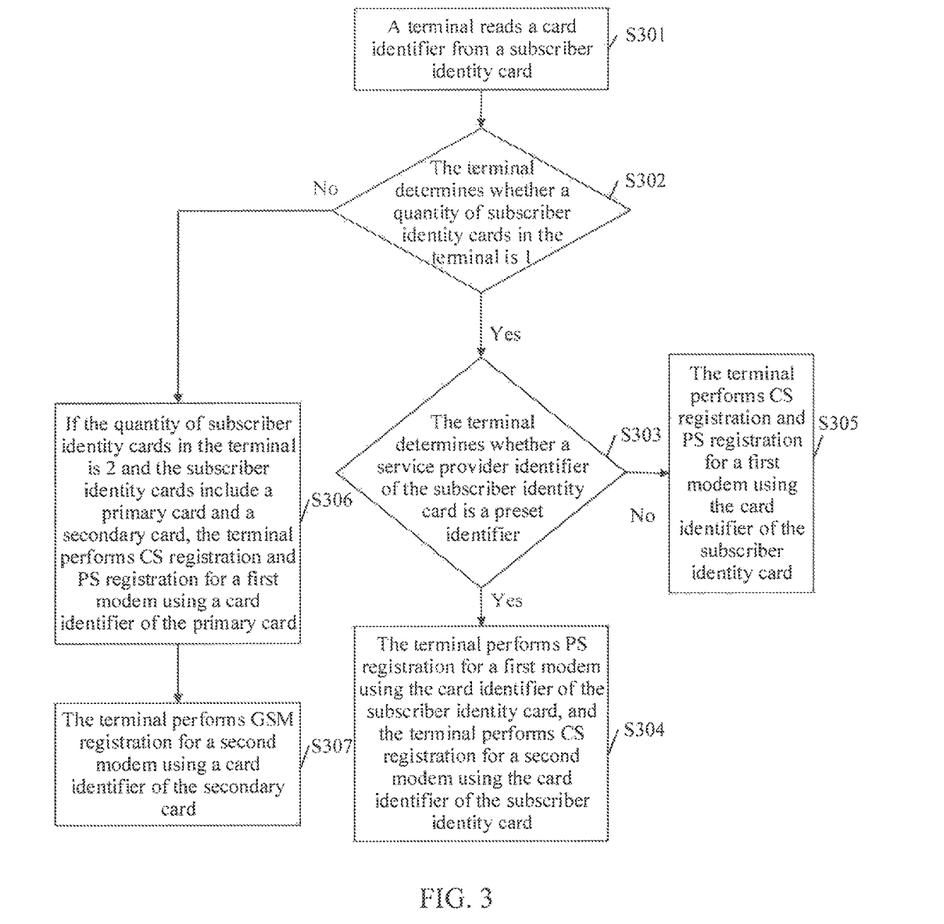
FIG. 3 is a schematic flowchart of a second embodiment of a wireless communications network registration method according to a method embodiment of the present disclosure.

Referring to FIG. 3, FIG. 3 is a schematic flowchart of a wireless communications network registration method according to a second embodiment of the present disclosure. As shown in FIG. 3, the wireless communications network registration method includes the following steps.

Step S301. A terminal reads a card identifier from a subscriber identity card.

For a specific implementation of step S301, refer to related descriptions of step S201 in the wireless communications network registration method disclosed in the first embodiment of the present disclosure, and details are not described herein again.

Step S302. The terminal determines whether a quantity of subscriber identity cards in the terminal is 1.

If yes, step S303 is performed.

If no, step S306 is performed.

Step S303. The terminal determines whether a service provider identifier of the subscriber identity card is a preset identifier.

If yes, step S304 is performed.

If no, step S305 is performed.

Optionally, the preset identifier may be 46000, 46002, or 46003, or may be 898600, 898602, or 898603.

Optionally, a specific implementation of determining, by the terminal, whether a type of the subscriber identity card is a preset type may include determining, by the terminal according to the card identifier of the subscriber identity card, whether the service provider identifier of the subscriber identity card is the preset identifier.

Optionally, a specific implementation of determining, by the terminal according to the card identifier of the subscriber identity card, whether the service provider identifier of the subscriber identity card is the preset identifier includes determining, by the terminal according to a PLMN of the subscriber identity card, whether the type of the subscriber identity card is the preset type. For example, PLMNs of China Mobile are 46000 and 46002, a PLMN of China Unicom is 46001, and a PLMN of China Telecom is 46003. If the PLMN that is of the subscriber identity card and that is obtained by the terminal is 46000, it indicates that the service provider identifier of the subscriber identity card is the preset identifier.

Optionally, a specific implementation of determining, by the terminal according to the card identifier of the subscriber identity card, whether the service provider identifier of the subscriber identity card is the preset identifier includes determining, by the terminal according to an ICCID of the subscriber identity card, whether the type of the subscriber identity card is the preset type. For example, the ICCID includes a total of 20 digits, and an encoding format of the ICCID is XXXXXX 0MFSS YYGXX XXXXX. The first six digits indicate a service provider code. 898600 and 898602 indicate China Mobile, 898601 indicates China Unicom, and 898603 indicates China Telecom. If the first six digits of the ICCID that is of the subscriber identity card and that is obtained by the terminal are 898600, it indicates that the service provider identifier of the subscriber identity card is the preset identifier.

Step S304. The terminal performs PS registration for the first modem using the card identifier of the subscriber identity card, and the terminal performs CS registration for the second modem using the card identifier of the subscriber identity card.

For a specific implementation of step S304, refer to related descriptions of step S202 in the network registration method disclosed in the first embodiment of the present disclosure, and details are not described herein again.

Step S305. The terminal performs CS registration and PS registration for the first modem using the card identifier of the subscriber identity card.

For example, when the terminal has only one subscriber identity card, a service provider identifier of the subscriber identity card is 46001, and a supportable network standard is LTE, the terminal performs CS registration and PS registration for the first modem using the card identifier of the subscriber identity card (that is, the terminal registers a PS service and a CS service of the first modem, that is, a CSFB technology is used). CSFB is a single card single standby solution. The terminal can work only on one network. For example, in LTE, when there is an incoming voice call, the terminal returns to a 2G/3G network by means of fallback.

Optionally, after the performing, by the terminal, CS registration and PS registration for the first modem using the card identifier of the subscriber identity card, a working mode of the terminal is CSFB in this case. Because for CSFB in which the service provider identifier of the subscriber identity card is 46001, in a call process, the terminal falls back to WCDMA or LTE from CSFB in most cases, in this case, the terminal can support concurrency of a data service and a voice call. However, the terminal may fall back to GSM instead of WCDMA because current signal quality is relatively poor. In this case, the terminal cannot support concurrency of the data service and the voice call. Therefore, to implement concurrency of the data service and the voice call for the terminal, when the terminal is in a call state, the terminal needs to detect whether a current network standard of the terminal is the GSM. If the current network standard of the terminal is the GSM, the terminal performs PS registration for the second modem using the card identifier of the subscriber identity card. Therefore, the terminal can perform the data service using the second modem, thereby implementing concurrency of the data service and the voice call for the terminal. If the current network standard of the terminal is not the GSM, no operation is performed.

Optionally, to reduce power consumption of the terminal, before the performing, by the terminal, PS registration for the second modem using the card identifier of the subscriber identity card, the terminal detects whether there is a data service request. If there is a data service request, the terminal performs PS registration for the second modem using identifier information of the subscriber identity card. If there is no data service request, no operation is performed.

Step S306. If the quantity of subscriber identity cards in the terminal is 2 and the subscriber identity cards include a primary card and a secondary card, the terminal performs CS registration and PS registration for the first modem using a card identifier of the primary card.

Optionally, if the quantity of subscriber identity cards in the terminal is 2, there are generally a primary card and a secondary card in the terminal. The primary card and the secondary card both support a data service and a voice service. However, a network service supported by the primary card is an LTE service, and a network service supported by the secondary card is a GSM service only. Therefore, before performing PS registration and CS registration, the terminal needs to determine the primary card of the terminal. A specific implementation of determining the primary card of the terminal may include obtaining, by the terminal, location identifiers of the two subscriber identity cards, and obtaining, by the terminal, a target subscriber identity card whose location identifier matches a preset location identifier, and using the target subscriber identity card as the primary card of the terminal. Information of the location identifier may be a slot identifier. For example, provided that a location identifier corresponding to a subscriber identity card 1 is slot 1 and preset location identifier information is slot 1, the subscriber identity card 1 is the primary card of the terminal.

Step S307. The terminal performs GSM registration for the second modem using a card identifier of the secondary card.

For example, when the quantity of subscriber identity cards is 2, the primary card is a subscriber identity card whose service provider identifier is 46000 and that can support a network standard of LTE or the primary card is a subscriber identity card whose service provider identifier is 46001 and that can support a network standard of LTE, and the secondary card is a subscriber identity card whose service provider identifier is 46000 or 46001, the terminal performs CS registration and PS registration for the first modem using the card identifier of the primary card, and the terminal performs GSM registration for the second modem using the card identifier of the secondary card. In this case, a working state of the terminal is CSFB+GSM. For another example, when the quantity of subscriber identity cards is 2, the primary card is a subscriber identity card whose service provider identifier is 46003 and that can support a network standard of LTE, and the secondary card is a subscriber identity card whose service provider identifier is 46001 or a subscriber identity card whose service provider identifier is 46000, the terminal performs CS registration and PS registration for the first modem using the card identifier of the primary card, and the terminal performs GSM registration for the second modem using the card identifier of the secondary card. In this case, a working mode of the terminal is SRLTE+GSM.

It should be noted that performing, by the terminal, GSM registration for the modem using the card identifier of the subscriber identity card is a technology well known by a person skilled in the art and is not described herein.

Optionally, if the wireless communications network registration method disclosed in the present disclosure is applied to a 3-card 3-pass terminal and the terminal includes a first modem, a second modem, and a third modem, after the determining, by the terminal, whether a quantity of subscriber identity cards in the terminal is 1, the wireless communications network registration method shown in FIG. 3 further includes that if the quantity of subscriber identity cards in the terminal is 3 and the subscriber identity cards include a primary card, a first secondary card, and a second secondary card, performing, by the terminal, CS registration and PS registration for the first modem using a card identifier of the primary card, performing, by the terminal, GSM registration for the second modem using a card identifier of the first secondary card, and performing, by the terminal, GSM registration for the third modem using a card identifier of the second secondary card.

For example, when the quantity of subscriber identity cards is 3, the primary card is a subscriber identity card whose service provider identifier is 46000 and that can support a network standard of LTE, and the two secondary cards are subscriber identity cards whose service provider identifiers are 46001, or when the primary card is a subscriber identity card whose service provider identifier is 46001 and that can support a network standard of LTE and the two secondary cards are subscriber identity cards whose service provider identifiers are 46000, the terminal performs CS registration and PS registration for the first modem using the card identifier of the primary card, and the terminal performs GSM registration for the second modem and the third modem separately using the card identifiers of the secondary cards. In this case, a working state of the terminal is CSFB+GSM+GSM.

Optionally, if the wireless communications network registration method disclosed in the present disclosure is applied to a 3-card 3-pass terminal and the terminal includes a first modem, a second modem, and a third modem, after determining, by the terminal, whether a quantity of subscriber identity cards in the terminal is 1, the wireless communications network registration method shown in FIG. 3 further includes that if the quantity of subscriber identity cards in the terminal is 2 and the subscriber identity cards include a primary card and a secondary card, performing, by the terminal, PS registration for the first modem using a card identifier of the primary card, performing, by the terminal, CS registration for the second modem using the card identifier of the primary card, and performing, by the terminal, GSM registration for the third modem using a card identifier of the secondary card.

For example, the terminal is a 3-card 3-pass terminal, the quantity of subscriber identity cards read in step S301 is 2, a primary card is a subscriber identity card whose service provider identifier is 46000 and that can support a network standard of LTE/a subscriber identity card whose service provider identifier is 46003 and that can support a network standard of LTE, and a secondary card is a subscriber identity card whose service provider identifier is 46001, the terminal performs PS registration for the first modem using a card identifier of the primary card, the terminal performs CS registration for the second modem using the card identifier of the primary card, and the terminal performs GSM registration for the third modem using a card identifier of the secondary card. When the primary card is a subscriber identity card whose service provider identifier is 46000 and that can support a network standard of LTE, a working mode of the terminal is SGLTE+GSM. When the primary card is a subscriber identity card whose service provider identifier is 46003 and that can support a network standard of LTE, a working mode of the terminal is SVLTE+GSM.

It can be learned that, in this embodiment of the present disclosure, when the quantity of subscriber identity cards read by the terminal is 1 and the service provider identifier of the subscriber identity card is the preset identifier, the terminal performs PS registration for the first modem using card identifier information of the subscriber identity card, and performs CS registration for the second modem using the card identifier information of the subscriber identity card. In this way, channels in which a data service and a voice service are located do not interfere with each other, and the data service and the voice service can be simultaneously performed. In this way, the terminal can implement concurrency of the data service and the voice call service, thereby improving efficiency of handling a transaction by the terminal.

The following describes a unit composition structure of a terminal disclosed in an embodiment of the present disclosure. The unit composition structure of the terminal disclosed in this embodiment of the present disclosure is configured to execute the method implemented in the method embodiment of the present disclosure.

Figure 4:
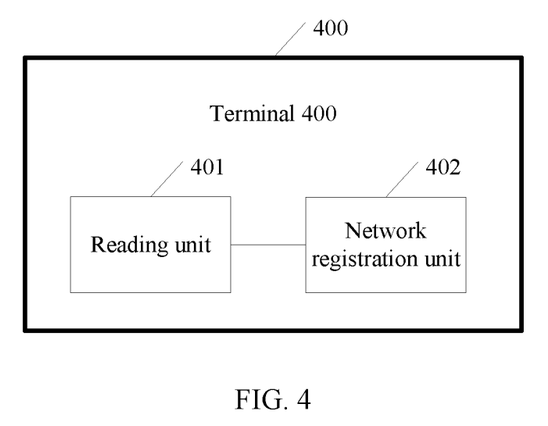
FIG. 4 is a schematic structural diagram of a unit composition of a terminal according to an embodiment of the present disclosure.

Based on a composition architecture of the terminal 100 shown in FIG. 1, an embodiment of the present disclosure discloses a terminal. Referring to FIG. 4, FIG. 4 is a schematic structural diagram of a unit composition of a terminal 400 disclosed in an embodiment of the present disclosure.

As shown in FIG. 4, the terminal 400 may include a reading unit 401 and a network registration unit 402.

The reading unit 401 is configured to read a card identifier from a subscriber identity card.

The network registration unit 402 is configured to perform PS registration for the first modem using the card identifier of the subscriber identity card, and perform CS registration for the second modem using the card identifier of the subscriber identity card if a quantity of subscriber identity cards in the terminal is 1 and a service provider identifier of the subscriber identity card is a preset identifier.

Optionally, the network registration unit 402 is further configured to perform CS registration and PS registration for the first modem using the card identifier of the subscriber identity card if the quantity of subscriber identity cards in the terminal is 1 and the service provider identifier of the subscriber identity card is not the preset identifier.

Optionally, after the network registration unit 402 performs CS registration and PS registration for the first modem using the card identifier of the subscriber identity card, the network registration unit 402 is further configured to perform PS registration for the second modem using the card identifier of the subscriber identity card when the terminal is in a call state and a current network standard of the terminal is GSM.

Optionally, the network registration unit 402 is further configured to perform CS registration and PS registration for the first modem using a card identifier of the primary card, and perform GSM registration for the second modem using a card identifier of the secondary card if the quantity of subscriber identity cards in the terminal is 2 and the subscriber identity cards include a primary card and a secondary card.

It should be noted that the foregoing functional units (the reading 401 and the network registration unit 402) are configured to execute related steps in the embodiments shown in FIG. 2 and FIG. 3.

In this embodiment, the terminal 400 is represented in a form of a functional unit. Herein, the "unit" may be an application-specific integrated circuit (ASIC), a circuit, a processor and a memory that execute one or more pieces of software or firmware programs, an integrated logical circuit, and/or another component that can provide the foregoing functions. In a simple embodiment, a person skilled in the art may figure out that the form shown in FIG. 1 may be used for the terminal 400. The reading unit 401 and the network registration unit 402 may be implemented using the processor and the memory that are shown in FIG. 1.

An embodiment of the present disclosure further provides a computer storage medium. The computer storage medium may store a program. When the program is executed, some or all of the steps of any wireless communications network registration method recorded in the foregoing method embodiment.

It should be noted that, to make the description brief, the foregoing method embodiments are expressed as a series of actions. However, a person skilled in the art should appreciate that the present disclosure is not limited to the described action sequence, because according to the present disclosure, some steps may be performed in another sequence or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present disclosure essentially, or the part contributing to other approaches, or all or a part of the technical solutions may be implemented in the form of a software product. The computer software product is stored in a memory and includes several instructions for instructing a computer device (which may be a personal computer, a server, a network device, or the like) to perform all or a part of the steps of the methods described in the embodiments of the present disclosure. The foregoing memory includes any medium that can store program code, such as a universal serial bus (USB) flash drive, a read-only memory (ROM), a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer-readable memory. The memory may include a flash memory, a ROM, a RAM, a magnetic disk, and an optical disc.

The embodiments of the present disclosure are described in detail above. The principles and implementations of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A wireless communications network registration method, applied to a dual-card dual-pass terminal, the terminal comprising a first modem and a second modem, and the method comprising:
   reading, by the terminal, a card identifier from a subscriber identity card in in the terminal; and
   responsive to reading the card identifier, determining, by the terminal, whether additional subscriber identity cards are in the terminal,
   wherein when the terminal determines no additional subscriber identity cards are in the terminal, the method further comprises;
   determining, by the terminal, whether a service provider identifier of the subscriber identity card comprises a preset identifier; and
   performing, by the terminal, one of:
      packet switched (PS) registration for the first modem using the card identifier of the subscriber identity card and circuit switched (CS) registration for the second modem using the card identifier of the subscriber identity card when the terminal determines that the service provider identifier of the subscriber identity card comprises the preset identifier; or
      PS registration and CS registration for the first modem using the card identifier of the subscriber identity card when the terminal determines that the service provider identifier of the subscriber identity card does not comprise the present identifier.

2. The method of claim 1, further comprising performing, by the terminal, CS registration and PS registration for the first modem using the card identifier of the subscriber identity card in response to the terminal determining that additional subscriber identity cards are the terminal.

3. The method of claim 1, wherein after performing the CS registration and the PS registration for the first modem using the card identifier of the subscriber identity card when the terminal determines that the service provider identifier of the subscriber identity card does not comprise the preset identifier, the method further comprises performing, by the terminal, PS registration for the second modem using the card identifier of the subscriber identity card when the terminal is in a call state and a current network standard of the terminal comprises Global System for Mobile Communications (GSM).

4. The method of claim 1, when the terminal determines that additional subscriber identity cards are in the terminal, the method further comprises:
performing, by the terminal, CS registration and PS registration for the first modem using the card identifier of a the subscriber identity cards in the terminal; and
performing, by the terminal, Global System for Mobile Communications (GSM) registration for the second modem using a second card identifier of a secondary card selected from the additional subscriber identity cards in the terminal.

5. The method of claim 1, wherein the terminal determines whether the service provider identifier of the subscriber identity card comprises the preset identifier according to one of a Public Land Mobile Network (PLMN) of the subscriber identity card or an Integrate circuit card identity (ICCID) of the subscriber identity card.

6. The method of claim 1, wherein after performing the CS registration and the PS registration for the first modem using the card identifier of the subscriber identity card when the terminal determines that the service provider identifier of the subscriber identity card does not comprise the preset identifier, the method further comprises:
detecting, by the terminal, whether there are any data service requests while the terminal is performing a voice call service;
responsive to detecting that there is a data service request while the terminal is performing the voice call service, determining whether a current network standard of the terminal comprises Global System for Mobile Communications (GSM);
responsive to determining that the current network standard of the terminal comprises GSM, performing, by the terminal, PS registration for the second modem using the card identifier of the subscriber identity card; and
responsive to performing the PS registration for the second modem using the card identifier of the subscriber identity card, performing, by the terminal, the requested data service using the second modem while the terminal performs the voice call service.

7. A terminal, applied to dual card dual pass, comprising:
a first modem;
a second modem coupled to the first modem; and
a processor coupled to the first modem and the second modem and configured to:
read a card identifier from a subscriber identity card;
responsive to reading the card identifier, determine whether additional subscriber identity card are in the terminal;
responsive to determining that no additional subscriber identity cards are in the terminal, determine whether a service provider identifier of the subscriber identity card comprises a preset identifier; and
perform on of:
packet switched (PS) registration for the first modem using the card identifier of the subscriber identity card and circuit switched (CS) registration for the second modem using the card identifier of the subscriber identity card when the terminal determines that the service provider identifier of the subscriber identity card comprises the preset identifier; or
PS registration and CS registration for the first modem using the card identifier of the subscriber identity card when the terminal determines that the service provider identifier of the subscriber identity card does not comprise the preset identifier.

8. The terminal of claim 7, wherein the processor is further configured to perform CS registration and PS registration for the first modem using the card identifier of the subscriber identity card responsive to the terminal determining that additional subscriber identity cards are in the terminal.

9. The terminal of claim 7, wherein the processor is further configured to perform, after performing the PS registration and the CS registration for the first modem using the card identifier of the subscriber identity card when the terminal determines that the service provider identifier of the subscriber identity card does not comprise the preset identifier, PS registration for the second modem using the card identifier of the subscriber identity card when the terminal is in a call state and a current network standard of the terminal comprises Global System for Mobile Communications (GSM).

10. The terminal of claim 7, wherein when the terminal determines an additional subscriber identity card is in the terminal that comprises a secondary card, the processor is further configured to:
perform CS registration and PS registration for the first modem using the card identifier of the subscriber identity card on the terminal; and
perform Global System for Mobile Communications (GSM) registration for the second modem using a second card identifier of the secondary card in the terminal.

11. A terminal, comprising:
a first modem;
a second modem coupled to the first modem;
a memory coupled to the first modem and the second modem and configured to store a code or an instruction; and
a processor coupled to the first modem, the second modem and the memory, the code or the instruction causing the processor to be configured to:
read a card identifier from a subscriber identity card;
determine whether additional subscriber identity cards are in the terminal;
responsive to determining that no additional subscriber identity cards are in the terminal, determine whether a service provider identifier of the subscriber identity card comprises a presser identifier; and
preform one of:
packet switched (PS) registration for the first modem using the card identifier of the subscriber identity card and circuit switched (CS) registration for the second modem using the card identifier of the subscriber identity card when the terminal determines that the service provider identifier of the subscriber identity card comprises the preset identifier, or
PS registration and CS registration for the modem using the card identifier of the subscriber identity card when the terminal determines that the service provider identifier of the subscriber identity card does not comprise the present identifier.

12. The terminal of claim 11, wherein the code or the instruction further causes the processor to be configured to perform CS registration and the PS registration for the first modem using the card identifier of the subscriber identity card responsive to the terminal determining that additional subscriber identity cards are in the terminal.

13. The terminal of claim 11, wherein after performing the CS registration and the PS registration for the first modem using the card identifier of the subscriber identity card when the terminal determines that the service provider identifier of the subscriber identity card does not comprise the preset identifier, the code or the instruction further causes the processor to be configured to perform PS registration for the second modem using the card identifier of the subscriber identity card when the terminal is in call state and a current network standard of the terminal comprises Global System for Mobile Communications (GSM).

14. The terminal of claim 11, wherein when the terminal determines an additional subscriber identity card is in the terminal that comprises a secondary card, the code or the instruction further causes the processor to be configured to:
    perform CS registration and PS registration for the first modem using the card identifier of the subscriber identity card in the terminal; and
    perform Global System for Mobile Communications (GSM) registration for the second modem using a second card identifier of the secondary card in the terminal.

15. The terminal of claim 11, further comprising a third modem coupled to the memory and the processor, wherein when the processor determines that additional subscriber identity cards are in the terminal comprising a second subscriber identity card and a third subscriber identity card, the code or the instruction further causes the processor to be configured to:
    perform CS registration and PS registration for the first modem using the card identifier of the subscriber identity card in the terminal;
    perform Global System for Mobile Communications (GSM) registration for the second modem using a second card identifier of the second subscriber identity card in the terminal; and
    perform GSM registration for the third modem using a third card identifier of the third subscriber identity card in the terminal.

* * * * *

UNITED STATES PATENT AND TRADEMARK OFFICE
CERTIFICATE OF CORRECTION

PATENT NO. : 10,334,553 B2  
APPLICATION NO. : 16/062472  
DATED : June 25, 2019  
INVENTOR(S) : Li Shen Page 1 of 1

It is certified that error appears in the above-identified patent and that said Letters Patent is hereby corrected as shown below:

In the Claims

Column 14, Line 32, Claim 1 should read: "scriber identity card in the terminal"

Column 15, Line 9, Claim 4 should read: "of the subscriber identity card in the terminal; and"

Column 15, Line 53, Claim 7 should read: "whether additional subscriber identity cards are in the"

Column 15, Line 59, Claim 7 should read: "perform one of"

Column 16, Line 29, Claim 10 should read: "identity card in the terminal: and"

Column 17, Line 11, Claim 13 should read: "identity card when the terminal is in a call state and a current"

Signed and Sealed this  
Twenty-seventh Day of August, 2019

Andrei Iancu  
*Director of the United States Patent and Trademark Office*